March 31, 1959 A. F. VANDENBERG 2,880,278

AUTOMATIC PULSER

Filed Oct. 18, 1954 3 Sheets-Sheet 1

INVENTOR.
Albert F. Vandenberg
BY
McGrew & Edwards
ATTORNEYS

INVENTOR.
Albert F. Vandenberg
BY
McGrew and Edwards
ATTORNEYS

INVENTOR.
Albert F. Vandenberg
BY
McGrew & Edwards
ATTORNEYS

United States Patent Office 2,880,278
Patented Mar. 31, 1959

2,880,278

AUTOMATIC PULSER

Albert F. Vandenberg, Denver, Colo.

Application October 18, 1954, Serial No. 462,708
15 Claims. (Cl. 179—90)

This invention relates to an automatic dialing telephone, and more particularly to a telephone dialing system for automatically dialing one of a series of predetermined numbers selected by a simple code designation and a multiple selector switch, and to means for using the system.

A conventional telephone exchange system includes open or public lines which are connected through a main switchboard, and, also, private lines which use a central office switching assembly. The open lines are used for customary subscriber service, which involves assigning a number to each phone or line. The telephones of a particular system are all interconnected through a main switchboard which relays a dial impulse into the circuit of the telephone having the number corresponding to the impressed impulse to ring that telephone number it may be connected therewith. The numbers of such a typical system are customarily seven position or digit numbers, the first three denote the particular exchange station, and the last four numbers indicate the number of the particular phone. Private lines, on the other hand, normally constitute a very few telephones on closed lines, used for special purposes, and, therefore, two numbers are usually sufficient to accommodate the system.

The present invention includes means for automatically dialing a predetermined set of numbers on either a public or private system. For a great many purposes the device may be small enough to fit inside a standard telephone base, or it may be made as an attachment for a standard telephone. The system includes a device providing a simple and effective intercommunications system without the requirements of an elaborate switchboard assembly. The automatic dialing system may be made as an attachment for a standard telephone on public lines whereby a series of frequently used numbers on the public line system may be automatically dialed, and the telephone may, also, be used as a manually operated dial system when the automatic dialing attachment is disconnected from the telephone circuit. It has been reliably estimated that an individual telephone user has no more than about ten frequently used telephone numbers, that is, a frequency of use of more than once or twice a week. The device of the present invention is a readily adaptable automatic dialing system for these frequently used numbers. While the device provides an automatic means for dialing particular numbers, it is an inexpensive mechanism to make and install, and it is fast and efficient.

Included among the objects and advantages of the present invention is an automatic dial system for private or public telephone lines, which includes a single switch selector means for selecting a desired dial number. The dial mechanism includes motor means for operating the dialing mechanism which is activated by releasing the hand set cradle switch, and is reset by closing the cradle switch. The automatic dialing means impresses a preselected information impulse on a wire from one position to another. The dialing mechanism of the invention is readily adaptable to an electric switch selector means or a mechanical cam-operated selector means. The dial system provides means for fast and economical communications service between multiple points of frequent exchange. The automatic dialing system provides means for supplying the public with free telephone service to particular locations.

These and other objects and advantages may be readily ascertained by referring to the following description and illustration in which.

Figure 1:
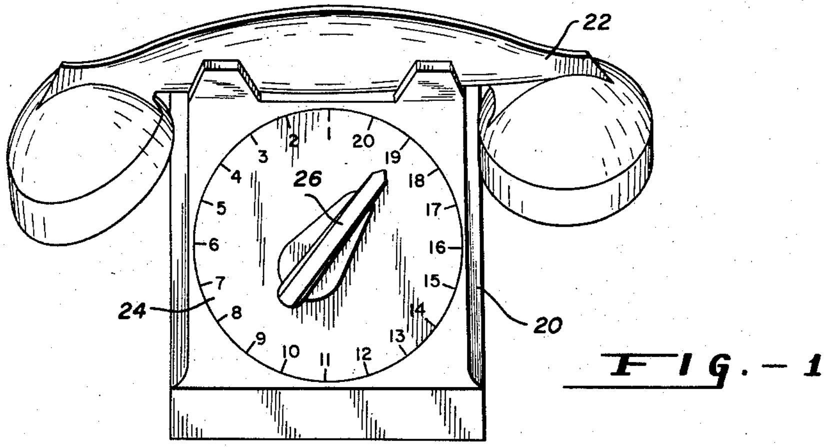
Fig. 1 is a perspective view of a telephone embodying the selector switch and coded dial arrangement according to the invention.

In one embodiment of the present invention, the automatic dial system replaces the dialing system of a conventional telephone, as illustrated in Fig. 1. A base 20 and a hand set 22 cradled thereon is substantially standard telephone equipment, but a coded dial 14 and a single pole, multiple pole selector switch 26 is used to replace the standard ten position manual dialing system.

The automatic dialing system of the present invention comprises a plurality of dialing drums, or discs, mounted for rotation on a common shaft. A single throw contact is mounted for operation on each dialing drum, and outwardly extending cam projections from the periphery of each drum opens and closes the contact riding thereon. Selector means predetermines which contact, and, therefore, the drum, is included in the telephone circuit so that the dial impulse represented by the number of projections on that particular dialing drum is impressed on the telephone line.

Figure 2:
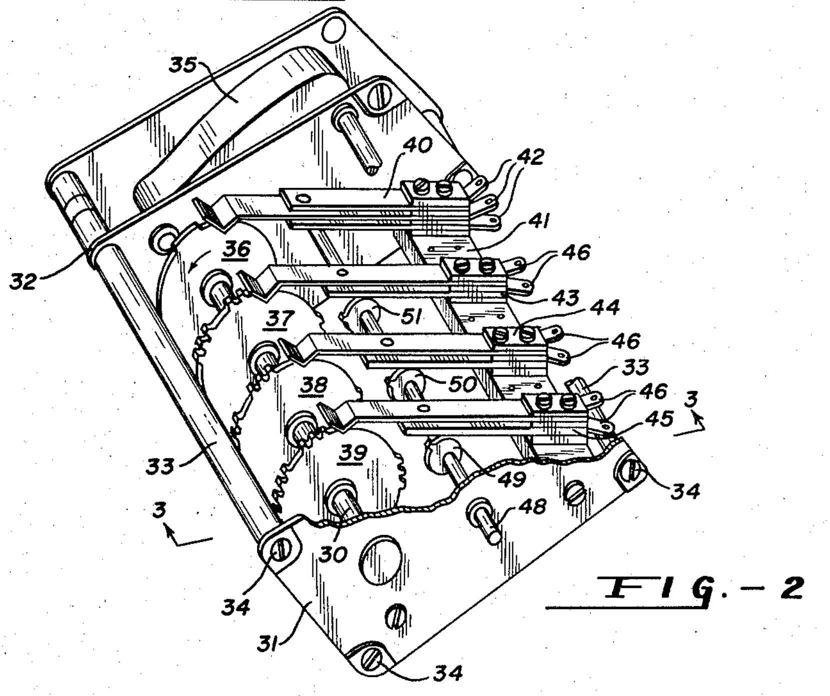
Fig. 2 is a perspective view of an automatic dialing mechanism of one embodiment of the invention.

In the modification illustrated in Fig. 2, a rotary shaft 30 is journaled for rotation in a front or head end plate 31 and a drive end plate 32. The end plates 31 and 32 are held together by means of spacer bars 33 which are secured to the end plate by means of bolts 34. The shaft 30 is driven by means of a gear motor assembly 35, connected to the drive end of the shaft. A timing drum 36 is mounted adjacent the drive end of shaft 30, and dialing drums 37 and 38 are spaced along the drum between the timing drum and the front end of the unit. A double throw contact switch 40 is mounted on a contact holding bar 41 in position to ride on timing drum 36 so as to open or close the contacts. Connectors 42 are provided on the contact 40 for connection to the circuit. Single throw contacts 43, 44, and 45 are mounted on the contact holding bar in position to operably contact dialing drums 37, 38, and 39 respectively. Connectors 46 are provided for each of the contacts for connecting the contacts into the circuit. A shaft 48 is journaled for rotation in end wall 31 and 32, spaced from the shaft 30, and cams 49, 50, and 51 are mounted on a shaft for rotation therewith. Cam 49 is positioned below contact 45, cam 50 is positioned below contact 44, and cam 51 is positioned below contact 43. The cams are spaced so as to successively move into engagement with their respective contacts, and are so positioned that only one contact at a time is in engagement with its contact while the rest of the cams are in non-engagement with their respective contacts.

Figure 3:
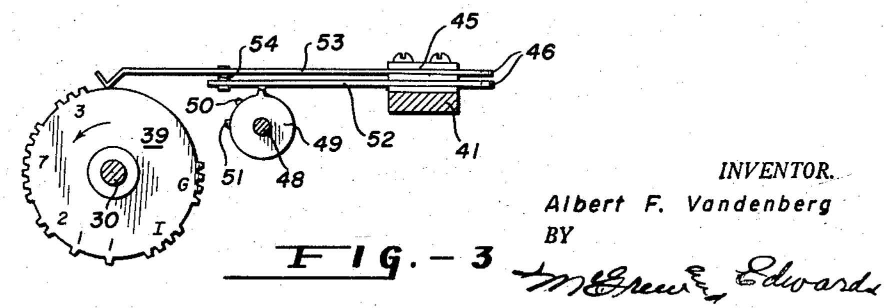
Fig. 3 is a side elevational view, in partial section, showing a dialing drum and cam-engaging means according to the invention.

A dialing drum and contact assembly is illustrated in detail in Fig. 3. The dialing drum 39 has seven sets of projections thereon, or the number of sets which indicate the number to be dialed. The telephone number on the drum 39 is indicated by the number of projections around the periphery of the drum. The number shown is 4411273; however, the telephone number is normally designated by two letters, a sub-station number and a four number phone designation, and the number on drum is equivalent to GI 1–1273. The drum 39 is mounted on shaft 30 and rotates counterclockwise, as indicated by the arrow. The cam 49 mounted on shaft 48 is rotated to where the cam projection contacts a lower contact bar 52 pushing it upwardly toward upper contact bar 53 so that contact points 54 meet. The shaft 48 is secured to a dial indicator 26 and it is rotated by turning the dial indicator to the desired number, as indicated on the dial 24. In the position illustrated where the cam 49 contacts its contact 45, cams 50 and 51 are not in position to make contact with their contacts, so that only the single drum 39 is in the circuit and the impulse corresponding to the number on the dialing drum 39 will be impressed on the telephone line.

For the sake of clarity only three dialing drums have been illustrated along with the timing drum 36. It is obvious, however, that any reasonable number of dialing drums may be placed on the shaft consistent with the size of the device. The dialing drums are of such a size and the motor drives the drums at a speed to complete the dialing in about five seconds. The time may, of course, be varied, depending on the size of the drums and the speed at which the motor drives the drums. The various connectors 46 are interconnected into the telephone circuit and the connectors 42 are interconnected into the circuit in conjunction with a power line for supplying power to the motor as will hereinafter be more fully explained.

The unit illustrated in Fig. 2 may be used as an attachment to a standard manual dial telephone, where it is connected into the telephone circuit without disturbing the standard circuit for the manual dialing. In this case a dial and position pointer are placed on the head end 32, and the dialing attachment is interconnected into the telephone circuit. The dialing attachment would normally require an off switch which would prevent operation of the automatic dialing system on lifting the receiver when the telephone is used as an ordinary telephone. This device in connection with the conventional telephone would permit the user to have several frequently used telephone numbers on the automatic dialing arrangement. The number of different drums which may be placed on a shaft for dialing different numbers is more or less controlled by the economic and space considerations. Under normal circumstances, however, ten to twenty numbers are sufficient for most subscribers, since only about ten numbers are frequently used by a subscriber. Such a system with a few select numbers on the automatic dialing system is invaluable for intra-office communications, and for business firms which have a few numbers which they call frequently throughout the business day. It is obvious that the cam arrangement may be replaced with a push button system, wherein a button would correspond to a particular number. In either case, where the dial mechanism is used for an entirely automatic telephone or in combination with a standard manual dialing system, the telephone, as illustrated in Figs. 2 and 3, is used for a public line.

Figure 4:
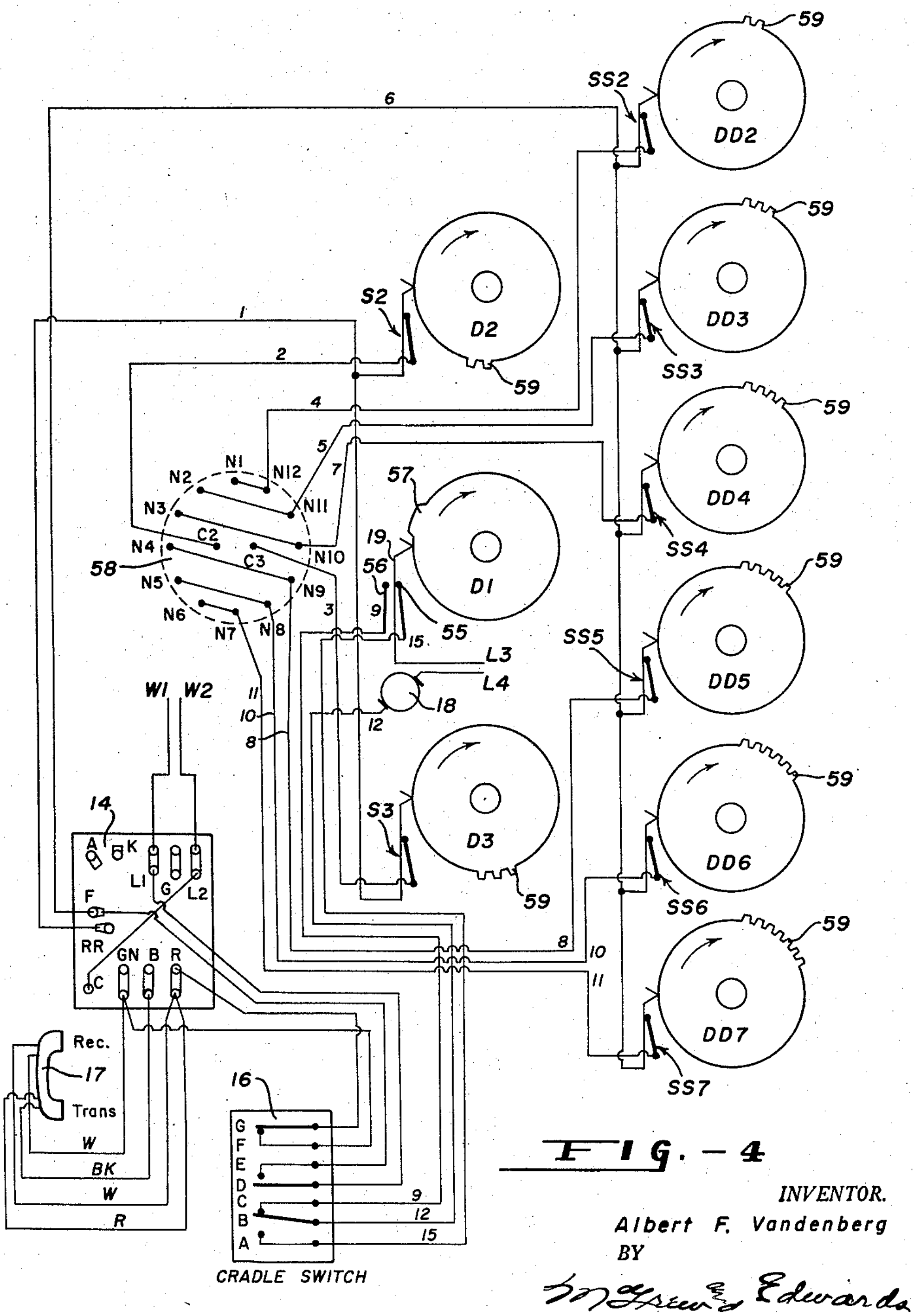
Fig. 4 is a schematic wiring diagram showing the connection of the invention to a conventional telephone wiring system.

The illustration of Fig. 4 shows the installation of the automatic system on Western Electric telephones 500 CW and 500 DW sets. The invention is, however, readily installed on substantially any type of telephone. The illustration shows the installation of the device as connected to the network of the telephone set using the wiring diagram and the actual terminals, rather than a schematic circuit diagram. For simplification, the tone circuit, which extends through RR, F, GN, B and R, is not shown. The tone circuit is well known, and includes conventional transformers, rectifiers, etc. Likewise, the ringer circuit is not shown connected into the wiring diagram, and it interconnects G, KA, and R with the usual condensers, coils, etc., for the bells. The device illustrated in Fig. 4 is for a private line system, so the normal dial circuit is disconnected or removed entirely from the system; likewise, the ringer system may be disconnected, depending upon the particular use for the device. With a device such as illustrated in Fig. 2, however, the dial circuit and the ringer could be retained in the instrument.

The connection of the device of the invention to the standard telephone is circuited as illustrated in Fig. 4. The telephone lead wires W1 and W2 are connected to leads L1 and L2 on a network or connector plate 14. A cradle switch 16, shown schematically, is interconnected to the various leads on the network, and a hand set 17 is likewise interconnected with the various leads of the network. Two series of dialing drums, that is D1 through D3 and DD2 through DD7 are mounted for rotation on a rotatable shaft in a frame, as indicated in Fig. 2. A motor 18 is interconnected with the shaft for revolving the shaft and the mounted dialing drums. The drum system as illustrated is for dialing twelve two digit numbers beginning at 2–2 through 27 and 3–2 through 37. The particular arrangement permits dialing twelve numbers with eight drums, and, obviously, by adding another drum to the first series so as to dial numbers beginning with 4, eighteen numbers may be dialed with nine drums. Drum D2 which dials 2 for the first digit and drum D3 which dials 3 for the first digit may, of course, be changed to dial any desired number one through nine; likewise, the drums DD2 through DD7, inclusive, are arranged to dial two through seven inclusive; however, they may be changed to dial any set of numbers desired. Leads L3 and L4 represent power lines, normally 110 volts, for driving motor 18.

A double throw contact switch 19, mounted for operation on timing drum D1, controls the operation of the motor. A double throw contact *abc* in the cradle switch controls the operation of the double throw switch 19. In the normal off position, when the hand set is in the cradle, switch *bc* is closed. In the normal off position, contacts *b* and *c* are together and contact 55 is closed with switch 19. The cam projection 57 of the timing drum D1 is just past the rider of contact switch 19. On lifting the hand set to release the cradle switch, contact is made between *a* and *b* which completes the circuit to the motor 18 activating the same to revolve the shaft around to where the rider again contacts the cam projection 57 on the timing drum D1. When the rider contacts the cam projection, contact 55 breaks from the switch and the power to the motor is cut off and the shaft stops at that point. On replacing the hand set, the cradle switch again throws the contacts *b* and *c* together and since contact 56 is in contact with switch 19, the motor again activates until the rider passes the cam projection 57 and drops to the periphery of the drum breaking the contact 56 and again stopping the motor. In this position the switch 19 is in connection with contact 15 ready for activating the motor on lifting the hand set again. The timing drum drives the shaft for a major portion of a revolution, and then it resets on placing the hand set in the cradle.

As indicated before, all the drums D1 through DD7 inclusive are mounted on a single shaft, such as shaft 30 illustrated in Fig. 2 and driven by a gear motor such as 35. As the shaft turns, all the dial drums turn with it, and as the projections on the dial drums pass the contact riders on each drum, the contacts close and open. A multiple position single pole switch 58 interconnects one of the drums D1 and D3, and one of the drums DD2 through DD7 into the telephone circuit so that the dial impulses from these two drums are impressed on the telephone line. The dial cam projections on the second series of drums DD2 through DD7 are spaced in back of, with respect to rotation, of the drums D2 and D3 so that the cam projections of the drums D2 and D3 engage their contacts prior to the engagement of cam projections of drums DD2 through DD7 with their contact rider. Drums D2 and D3 have a common lead 1 which is connected into the network 14 and into the cradle switch 16, and it forms one side of contacts S2 and S3 for drums D2 and D3 respectively. The other side of the contact S2 is interconnected with contact C2 of switch 58 and the other side of contact S3 is connected with the contact C3 of the switch.

A common lead 6 extends to the contacts SS2 through SS7 which are the contacts respectively for the drums DD2 through DD7. The other side of contact SS2 is connected to contacts N1 and N12 of the selector switch; likewise, the other side of contact SS3 is connected to the contacts N2 and N11. In similar manner contact SS4 is connected with contacts N3 and N10, contacts SS5 with contacts N4 and N9, SS6 with contacts N5 and N8, and SS7 with contacts N6 and N7. The contacts for each drum of the second dial series are connected with two contact points of the switch, so that each drum is used with both of the two first digit dial signals. The multiple selector switch connects the contacts N1 through N6 with contacts C3, and connects the contacts N7 through N12 with contact C2.

Drum D2 has two cam projections 59 on the periphery thereof, and the drum will close and open contact S2 twice to give a dialing impulse of 2. Similarly, dial drum D3 has three cam projections 59 and it will close and open contact S3 three times to provide a dialing impulse of 3. Drums DD2 through DD7 have projections 2 through 7 respectively to provide a second dial impulse of from 2 to 7. With the device illustrated in Fig. 4, the automatic dial system will send impulses equivalent to 2–2 through 2–7 inclusive and 3–2 through 3–7 inclusive. As only two digit impulses are impressed on the telephone line, the dialing drums may be quite small, and in one preferred form, the drums rotate the dialing revolution in three seconds, so that a very fast dialing impulse is obtained.

In operation, a telephone, similar to the device illustrated in Fig. 1, has an index dial containing numbers 1 through 12 thereon and a selector 26. The selector 26 is turned to the desired number, indicated by the code on the dial on the telephone. For example, if the indicator is turned so as to contact C2 and N11, on lifting the hand set from the cradle switch the motor 18 is activated by the closing of contact of contacts *ab*. Contact 55 touches the rider 19 and on closing contact *ab*, the motor is activated to drive the shaft and rotate the drum. As the cam projections 59 pass the rider of contact S2, contact is closed and the dial impulse 2 is impressed on the lines W1 and W2, and as the selector 26 contacts N11 leading to dial drum DD3, a dial impulse of 3 is impressed on the line W1 and W2 shortly after the impulse from drum D2 is impressed on the line as the cam projections 59 of drum DD3 pass the rider of contact SS3. When the timing drum cam projection 57 strikes the rider to open contact 55, the motor stops and if the party at the number called answers the phone, conversation may be continued until completed. At the time the hand set is replaced making contact *bc*, since the rider of switch 19 is in contact with contact 56, the motor is activated to rotate a shaft of the dialing drum past the point where the rider drops off the cam projection 57 where an outer contact 56 opens and inner contact 55 makes. Since *ab* contact is not closed, the motor stops again due to the break in the power line L3 and L4 leading to motor 18. In a similar manner, any of the two digits of the drums running from 22 to 37 may be obtained from the system.

The number of drums D2, D3 and DD2 through DD7 is determined by the number of telephone points desired to be called from the single telephone; for most purposes, twenty is sufficient. Instead of a two digit dial signal, a seven digit dial signal may be impressed on the telephone line by using the drums similar to those shown in Figs. 2 and 3, and by providing a simple selector switch for determining which of the dialing impulses of the drums are to be impressed on the lines W1 and W2.

The timing drum provides means for impressing a desired dialing impulse on a telephone line, and then shutting off the dial mechanism so that the dial tone is not pressed on the line when conversation is desired. On replacing the hand set, the timing drum provides means for resetting the device for operation on lifting the hand set. By using the timing drum all the dialing drums may be placed on a single shaft and driven at the same speed so as to prevent complication of the structure and arrangement. The operation of the motor is controlled by the standard cradle switch in the conventional telephone so that additional switching is not required for the operation of the automatic dial means. This permits the use of the dial system in conjunction with the manual control of the telephone.

Figure 5:
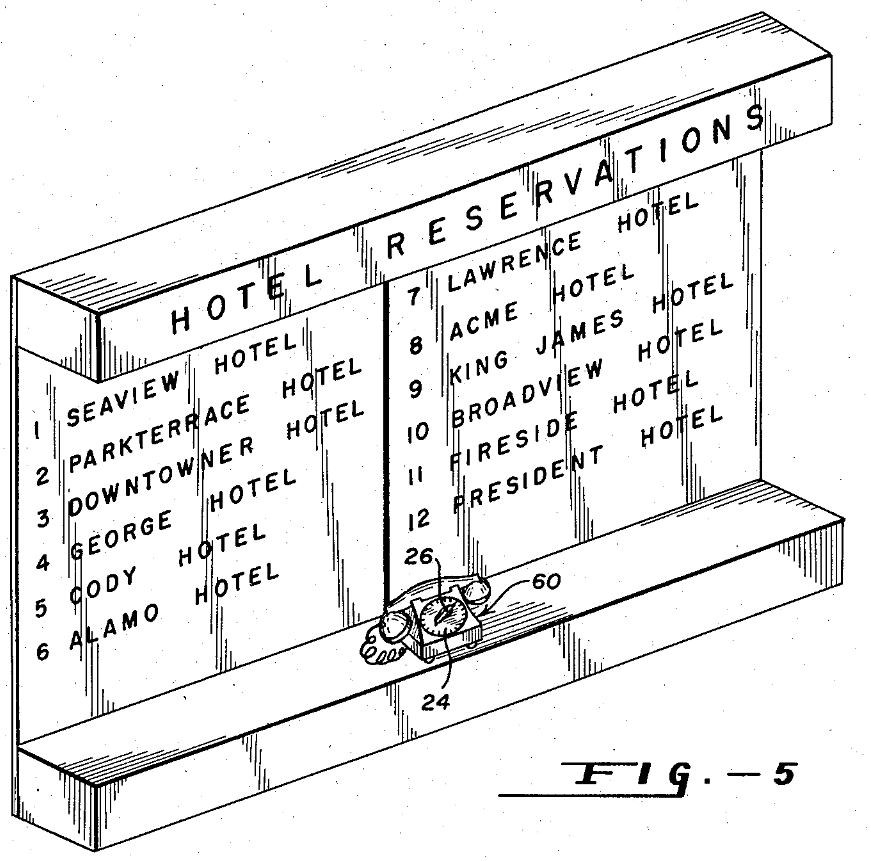
Fig. 5 is a perspective view of an automatic phone dialing phone, for a private line system, interconnected with a coded directory.
Figure 6:
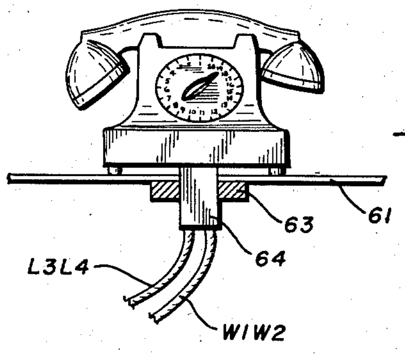
Fig. 6 is a front elevation detail of the phone of Fig. 5, in partial section, showing the attachment to the information board.

The automatic dial means provides a system with which free telephone service may be provided for the public without the abuse of the phone service which would normally occur without such a system. By removing the manual dial system from a conventional telephone and inserting the automatic dial means, free communication service may be provided for the public; for example, a hotel reservation system as illustrated in Fig. 5. In this case, an automatic telephone, shown in general by numeral 60, is secured to a ledge or shelf 61 placed in a railroad station, bus terminal, airport, or the like where travelers entering a city may utilize the free service for obtaining a hotel reservation. An information board 62 is secured to the shelf 61 and the subscribing hotels of the particular city, coded to correspond with the numerals of dial 24 of the telephone, are listed on the information board. Since not all hotels in the particular town will subscribe to the service or can subscribe to the service, a listing in other than alphabetical form is preferred. For example, the hotels may be listed in order of number of rooms available, or they may be listed according to the minimum room price, etc. The code indicated on the board corresponds to the numbers on the dial of the telephone. The telephone is secured to the shelf 61 by means of a nut 63, or other suitable means, secured on conduit 64 which extends into the base of the telephone. Power lines L3 and L4 pass through the conduit into the telephone as well as the telephone lines W1 and W2. A passenger arriving at the particular terminal desiring a hotel reservation merely approaches the board, determines in which hotel he desires a reservation, turns the selector 26 to the coded number on the dial and lifts the telephone; and within three to five seconds, the reservation desk of that hotel is obtained. On completing the call, the user replaces the hand set in the cradle, and the telephone resets itself ready for the next use. The system provides an efficient and economical luxury service for obtaining a hotel reservation. The speed and convenience of obtaining the reservation desk of the desired hotel provides customer good will for the hotels as well as the travel facilities. In most cities, the telephone numbers now have a seven digit number, and a stranger entering a town normally is unfamiliar with the telephone stations and sub-stations, so considerable difficulty in dialing a telephone number is encountered. This is especially true when more than one hotel has to be called in an attempt to find suitable accommodations.

The automatic dialing or impulse sender is, of course, useful for other purposes, for example, in interoffice communications, telemetering, etc. The simplicity of design and versatility of impulse sending makes the device readily adaptable for telemetering and similar uses as applied to operating electric relays and the like. The drums may be used to close a circuit to a selected point and to impress an impulse on the circuit corresponding to the desired information to operate various relays to perform various functions at the selected point. The equipment for telemetering is essentially the same as for automatic dialing telephones, the difference being in the spacing of the projections of the pulser or dialing drums and the circuit of receiving point.

While the invention has been illustrated by means of specific examples, there is no intent to limit the invention to the precise details so illustrated, except insofar as set forth in the following claims.

I claim:

1. In an automatic dial mechanism activated by releasing a telephone hand set cradle switch, a rotatable shaft, means for revolving said shaft, said means for revolving said shaft being interconnected with said cradle switch, timing drum means mounted on said shaft, a double throw contact interconnected with said means for revolving said shaft arranged for operation on said timing drum means whereby opening said cradle switch activates said revolving means to rotate said shaft less than one complete revolution and to complete the remaining portion of a complete revolution on closing said cradle switch, plural dialing drums mounted for rotation on said shaft, a contact mounted for operation with each of said dialing drums, each of said dialing drums including means for opening and closing its associated contact in a predetermined sequence, and selector means arranged for predetermining the inclusion of at least one of said contacts in a circuit whereby to transmit the impulses of the corresponding drum on a telephone line.

2. In an automatic dial mechanism activated by releasing a telephone hand set cradle switch, a rotatable shaft, means for revolving said shaft, said means for revolving said shaft being interconnected with said cradle switch, timing drum means mounted on said shaft, a double throw contact interconnected with said means for revolving said shaft arranged for operation on said timing drum means whereby opening said cradle switch activates said revolving means to rotate said shaft less than one complete revolution and to complete the remaining portion of a complete revolution on closing said cradle switch, plural dialing drums mounted for rotation on said shaft, a contact mounted for operation with each of said dialing drums, each of said dialing drums including means for closing and opening said contact in a predetermined sequence, and selector means for operatively predetermining the inclusion of at least one of said contacts into a telephone circuit whereby to transmit the impulse of the corresponding drum on a telephone line.

3. A device according to claim 2 in which the selector means is a series of cams on a rotatable shaft arranged to close at least one of said contacts and maintaining the remainder open.

4. A device according to claim 2 in which the selector means is a single pole multiple position selector switch for interconnecting at least one of said contacts into the telephone circuit for transmitting the impulse of the corresponding drum on the telephone line.

5. In an automatic dial mechanism activated by opening a telephone hand set cradle switch, a rotatable shaft, means for revolving said shaft, a timing drum mounted on said shaft, said means for revolving said shaft being interconnected with said cradle switch, a double throw contact interconnected with said means for revolving said shaft arranged for operation on said timing drum whereby opening said cradle switch activates said rotating means to rotate its shaft less than a 360° revolution and to complete the remainder of the 360° revolution on closing said cradle switch, plural series of dialing drums mounted for rotation on said shaft, a contact arranged for operation on each drum of said plural series, the series of said drums being arranged to open and close their respective contacts successively, and selector means for preselecting a single contact from each series for inclusion in said circuit whereby releasing said cradle switch activates said revolving means and the dial impulse of each drum of said series associated with each included contact is successively impressed on said telephone line.

6. In an automatic dial mechanism activated by releasing a telephone hand set cradle switch, a rotatable shaft, means for revolving said shaft, said means for revolving said shaft being interconnected with said cradle switch, a timing drum mounted on said shaft, a double throw contact arranged for operation on said timing drum whereby releasing said cradle switch activates said rotating means to rotate its shaft less than a 360° revolution and to complete the remainder of the 360° revolution on closing said cradle switch, two series of dialing drums mounted for rotation on said shaft, a make-break normally open contact arranged for operation on each drum of said series, means on each drum for opening and closing its contact in a predetermined series of impulses, the two series of said drums being arranged to operate their contacts successively, and selector means for preselecting a single contact from each series for inclusion in said circuit whereby releasing said cradle switch activates said revolving means and the series of impulses from the drum corresponding to the single contact in each series is successively impressed on the telephone line.

7. A device according to claim 6 in which a single pole multiple position selector switch interconnects a single contact from both of said series into said telephone circuit whereby the series of impulses of the corresponding dialing drums is progressively impressed on the telephone line.

8. A device according to claim 6 in which a series of cams mounted on a rotatable shaft is arranged to close the contact of a single drum of each of said series whereby the series of impulses of the corresponding dialing drum is impressed on the telephone line.

9. In an automatic dial mechanism activated by releasing the telephone hand set cradle switch, a rotatable shaft, plural dial drums mounted on said shaft, each of said drums having a contact mounted for operation thereon, each of said contacts being interconnected with a telephone circuit, a motor for revolving said shaft, said cradle switch being interconnected with the power line of said motor, cam means mounted on said shaft inclusive of switch means interconnected with the power line of said motor arranged for activating said motor on opening said cradle switch and stopping said motor prior to completion of one full revolution of said shaft and then activating said motor to complete the full rotation of said shaft on closing said cradle switch, and means for singly activating at least one of said contacts whereby said contact is included in said telephone circuit and information of its corresponding dialing drum is impressed on the telephone line.

10. In an automatic dial mechanism activated by releasing the telephone hand set cradle switch, a rotatable shaft, plural dial drums mounted on said shaft, each of said drums having a normally open contact mounted for operation thereon, each of said contacts being interconnected with a telephone circuit, motor for revolving said shaft interconnected with said cradle switch, timing cam means mounted on said shaft inclusive of a double throw contact means interconnected with the power line of said motor arranged for starting said motor on releasing said cradle switch and stopping said motor prior to completion of one full revolution of said shaft and then activating said motor to complete the full rotation of said shaft on closing said cradle switch, and switch means for selectively closing one of said open contacts whereby said contact is included in said telephone circuit and the information of its corresponding dialing drum is impressed on the telephone line.

11. An automatic dial mechanism for a telephone activated by releasing the hand set cradle switch thereof, comprising a rotatable shaft, means interconnected and operated by said cradle switch for rotating said shaft, a timing drum mounted for rotation on said shaft, a cam projection on said drum extending outwardly from the circumference of said drum, a double throw contact arranged for operation with said drum whereby releasing said cradle switch activates said revolving means to rotate said shaft from a position at which said double throw contact is adjacent one side of said cam projection and one side of said double contact is closed permitting operation of said motor to a position when said double throw contact is on the other side of said cam projection and the opposite side of said double contact is closed stopping said motor, and releasing said cradle switch activates said revolving means to revolve said shaft, plural dialing drums mounted for rotation on said shaft, a single throw contact arranged for operation on each of said dialing drums, each dialing drum including plural cam projections on the periphery thereof for opening and closing said contacts for impressing a predetermined dial impulse on a telephone line, and selector means for preselecting at least one of said contacts for inclusion into a telephone circuit for impressing the dial information of its corresponding drum thereon on activating said circuit.

12. A device according to claim 11 in which the dialing drums are arranged in series and where the impulses of one drum of each series are successively impressed on a telephone circuit, and the selector means interconnects one contact from each series into the telephone line whereby multiple dial information is successively impressed on the telephone line on activating said rotating means.

13. In combination with a telephone circuit, a support member, an automatic telephone secured in substantially horizontal position on said support and arranged to automatically dial a plurality of preselected telephone numbers, an information board depending from said support, a selector dial mounted on said telephone having a plurality of position indicia thereon, said information board having call positions of the preselected numbers coded to correspond to the indicia of said selector dial, and a selector switch mounted on said telephone for selecting one of the coded indicia of said dial whereby a user may preselect a telephone number prior to operation of said automatic telephone.

14. In combination with a telephone circuit, a support member, an automatic telephone secured in substantially horizontal position on said support and arranged to automatically dial a plurality of preselected telephone numbers, an upright information board extending from said support and interconnected thereto, said information board containing readily readable information of all of said telephone numbers of said automatic telephone coded into a simple number, dial on said telephone having numbers corresponding to the numbers of said board, and position selector switch for preselecting a single telephone number mounted on said telephone whereby the number may be preselected prior to operation of said automatic telephone.

15. In an automatic pulser for an electric circuit having an activating switch, a rotatable shaft, a motor for rotating said shaft, a timing drum mounted on said shaft, a double throw contact switch interconnected with the motor power lines arranged for operation on said timing drum, means on said timing drum for opening and closing said double throw contact to permit operation of said motor by means of said activating switch and for stopping said motor at less than a complete shaft revolution on activation of said circuit and to complete the revolution and reset the double throw contact on deactivating the circuit, plural pulser drums mounted for rotation on said shaft, a contact arranged for operation with each pulser drum, and means for selectively closing at least one of said pulser drums in said circuit whereby an information impulse from the associated drum is impressed on said circuit during said revolution.

References Cited in the file of this patent

UNITED STATES PATENTS

| | | |
|---|---|---|
| 2,061,273 | Green | Nov. 17, 1936 |
| 2,183,713 | Field | Dec. 19, 1939 |
| 2,209,615 | Sengebusch | July 30, 1940 |
| 2,576,189 | Oliver | Nov. 27, 1951 |